April 7, 1970   D. E. WOLF ET AL   3,505,565
BIN LEVEL INDICATORS
Filed June 1, 1967

INVENTORS
Donald E. Wolf
Gerald H. Servos
by McDougall, Hersh, Scott
and Ladd
Attys

United States Patent Office 3,505,565
Patented Apr. 7, 1970

3,505,565
BIN LEVEL INDICATORS
Donald E. Wolf, Glen Ellyn, and Gerald H. Servos, Elmhurst, Ill., assignors to Monitor Mfg., Inc., Minden City, Mich., a corporation of Michigan
Filed June 1, 1967, Ser. No. 642,902
Int. Cl. H02h 7/00, 3/28, 5/04
U.S. Cl. 317—13                15 Claims

ABSTRACT OF THE DISCLOSURE

A fail-safe bin level indicator having a drive motor, a torque responsive switch which is operated between first and second positions to de-energize the motor in response to the development of pre-determined torque by the motor, and a relay device which is connected to the motor and the switch and is operated by either burn-out of the motor or excessive current through the motor, but not by normal movement of the switch, the relay device preferably comprising a solid state electronic switch having an input circuit with connections to both the motor and the switch, and an output circuit connected to an electro-magnetic relay which operates electrical contacts to perform switching and signaling functions in the event of motor burn-out or failure of other components of the system. In another embodiment, the torque responsive switch is not employed in the system.

---

This invention relates to bin level indicators which are adapted for carrying out various signaling and control functions in response to changes in the level of granular or other flowable material in a bin or the like. Such bin level indicators are employed, for example, to control the conveyors and other machinery used in filling and emptying a bin, so that the material will be maintained at the desired level in the bin. In a system of this kind, the bin level indicators prevent the bin from becoming empty and also prevent overfilling of the bin.

The present invention relates in particular to bin level indicators of the general type disclosed in the Lenhart patent, No. 2,116,075, patented May 3, 1938. A bin level indicator of this type employs a motor which drives a paddle wheel or the like, adapted to engage the granular material in the bin when the material rises to the level at which the wheel is located. The drag of the material on the paddle wheel causes the motor to develop additional torque, which is sensed by a switch or some torque responsive element. The switch is then employed to carry out various signaling and control functions. For example, the switch may be employed to shut off the conveyor which is filling the bin. The switch may also be employed to operate electric lamps, horns, and other warning devices. In the bin level indicator of the Lenhart patent, the switch is also employed to de-energize the motor so that it will not be heated unnecessarily when it is stalled by the engagement of the material with the paddle wheel. In other bin level indicators, the motor is not de-energized but is allowed to remain energized in a stalled condition.

One object of the present invention is to provide a new and improved bin level indicator which is fail-safe against motor burn-out. Prior bin level indicators of the types just described have the disadvantage that motor burn-out causes an unsafe lapse in the operation of the control system. Thus, if the motor burns out, the paddle wheel will not rotate, and the torque switch cannot be operated. Thus, if the bin level indicator is controlling a filling conveyor, the conveyor will not stop, and the material may overflow from the bin.

In the bin level indicator of the present invention, the burn-out of the motor, or any other interruption in the normal motor current, causes the operation of a relay device which carries out the desired switching and signaling functions, such as stopping the conveyor and operating a warning device. The present invention may be employed in connection with a bin level indicator in which the motor is de-energized by the torque responsive switch, in which case the relay device is operated by motor burn-out but not by de-energization of the motor due to the normal movement of the torque responsive switch.

The present invention preferably employs an electronic switching component having an input circuit which is connected to both the motor and the torque responsive switch. The electronic switch preferably has an output circuit which includes an electro-magnetic relay for performing desired switching functions.

A further object is to provide a new and improved bin level indicator which is protected against excessive current through the motor or other components of the system. Such excessive current preferably operates an over-current circuit interruptor which causes the relay device to carry out the same functions as in the case of motor burn-out.

The bin level indicator of the present invention is compact and low in cost but highly effective in making the control system fail-safe against motor burn-out and other component failures.

Further objects and advantages of the present invention will appear from the following description taken with the accompanying drawings in which.

Figure 1:
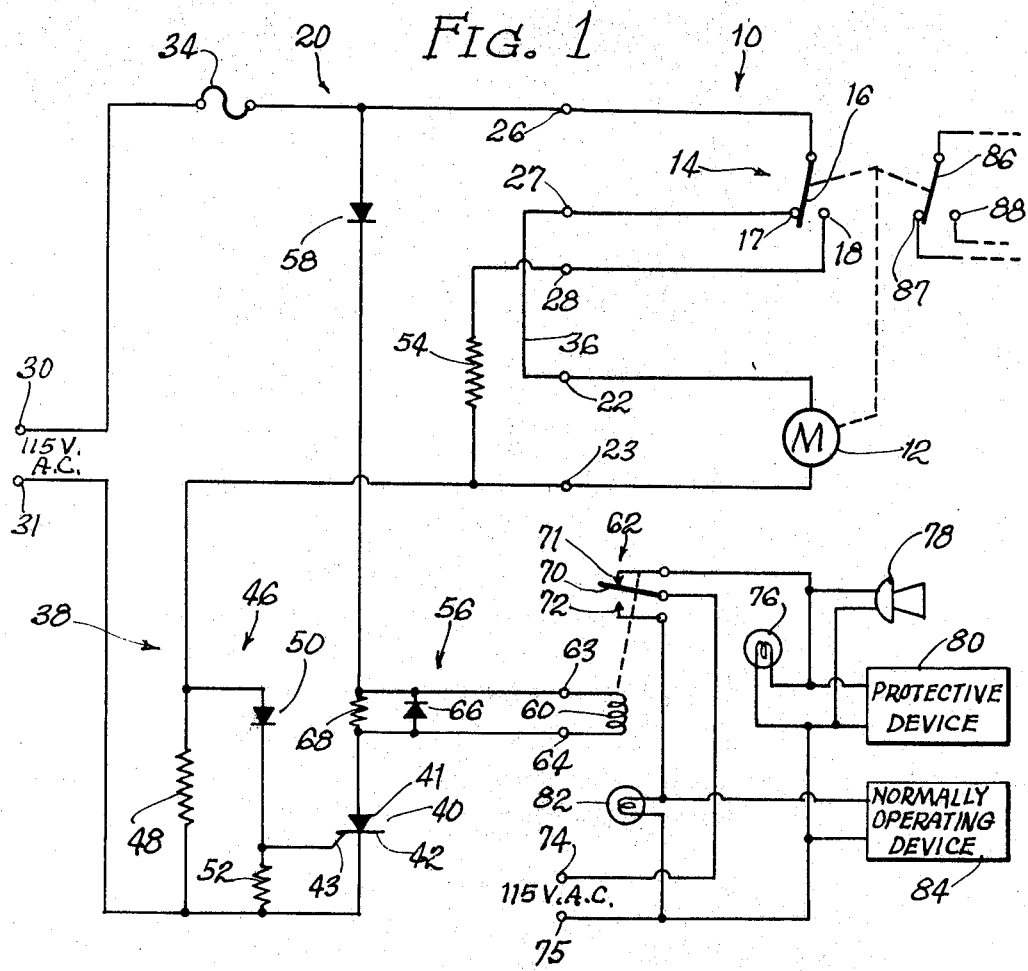
FIG. 1 is a circuit diagram of a fail-safe bin level indicator to be described as a modified embodiment of the present invention.

As just indicated, FIG. 1 illustrates a bin level indicator 10, which is of the general type disclosed in the above-mentioned Lenhart patent No. 2,116,075. The bin level indicator 10 comprises an electric drive motor 12 which operates a paddle wheel or some other device for sensing the presence or absence of granular material in the bin. The paddle wheel and the other mechanical components of the system are not shown, inasmuch as they may be similar to the construction in the Lenhart patent.

The bin level indicator 10 also comprises a torque responsive element in the form of a switch 14 which is adapted to be operated when the motor 12 develops additional torque due to the stalling of the paddle wheel by the rising material in the bin. The switch 14 is shown in its normal position, before it has been shifted to its second position by the additional torque developed by the motor. It will be seen that the switch 14 comprises a contact 16 which is movable between contacts 17 and 18. Initially, the contact 16 engages the contact 17, as shown.

A fail-safe control unit 20 is employed in conjunction with the motor 12 and the torque responsive switch 14. Both the motor 12 and the switch 14 are connected to the control unit 20. Thus, the control unit 20 has terminals 22 and 23 to which the motor leads are connected. In addition, the control unit 20 has terminals 26, 27 and 28 to which the switch contacts 16, 17, and 18 are connected.

The control unit 20 comprises power input terminals 30 and 31 adapted to receive electric power from a conventional power line which preferably supplies alternating current at 115 volts and 60 cycles or some other suitable voltage and frequency. The control unit 20 supplies the electric power to the motor 12 and the switch 14. To protect the motor 12 and other components of the system against excessive current, the control unit 20 comprises an overcurrent circuit interruptor, which is shown as being in the form of a fuse 34. In the illustrated circuit, the fuse 34 is connected between the power supply terminal 30 and the switch terminal 26, but it will be understood that the fuse may be connected to various other points in the circuit.

In the illustrated bin level indicator 10 the torque responsive switch 14 is employed to de-energize the motor 12 so that the motor will not be heated unnecessarily when the motor is stalled by the engagement of the paddle wheel with the material in the bin. As shown, the lead 36 is connected between the switch terminal 27 and the motor terminal 22, so that the motor 12 will be energized by closure of the contacts 16 and 17.

The control unit 20 comprises a relay device 38 for performing various functions in the event of motor burnout or failure of the other components of the system. The illustrated relay device 38 comprises an electronic switching component 40 preferably of the solid state type. The illustrated electronic switch 40 comprises a silicon controlled rectifier, but other controlled rectifiers and transistor devices may be employed. The illustrated silicon control rectifier is of the usual type, comprising anode and cathode electrodes 41 and 42, and a control electrode 43. The rectifier 40 is conductive when the control electrode 43 is tied to the anode 41, or is otherwise arranged to receive sufficient positive current, but is non-conductive when the control electrode is tied to the cathode or is not supplied with sufficient positive current. The controlled rectifier 40 has an input circuit 46 which is connected to both the motor 12 and the torque responsive switch 14. Thus, the input circuit 46 comprises a resistor 48 which is connected between the motor terminal 23 and the power supply terminal 31. The normal motor current flows through the resistor 48 and produces a voltage drop which is employed to maintain the control rectifier 40 in a conductive state. The alternating voltage across the resistor 48 is rectified by a diode 50 which is connected between the motor terminal 23 and the control electrode 43. Another resistor 52 is connected between the control electrode 43 and the power supply terminal 31 to conduct some of the current from the diode 50, so that only part of the diode current flows to the control electrode 43.

The input circuit 38 also comprises an impedance element illustrated as a resistor 54, which is connected between the switch terminal 18 and the motor terminal 23. When the switch 14 is operated by the added torque developed by the motor 12, the contact 16 engages the contact 18 so as to supply current to the input circuit 38 through the resistor 54. This current corresponds generally in magnitude to the normal motor current, so that the controlled rectifier is maintained in a conductive state despite the de-energization of the motor 12 by the switch 14.

The relay device 38 also comprises an output circuit 56 for the controlled rectifier 40. It will be seen that the cathode 42 of the controlled rectifier 40 is connected to the power supply terminal 31. The fuse 34, a diode 58, and a relay coil 60 are shown as being connected in series between the first power supply terminal 30 and the anode 41 of the controlled rectifier. The relay coil 60 is part of an electro-magnetic relay 62 which is generally separated from the control unit 20 but is functionally a part of the relay device 38. The illustrated coil 60 is connected to terminals 63 and 64 on the control unit 20. A damping diode 66 and a damping resistor 68 are preferably connected in parallel across the current terminals 63 and 64, to reduce the inductive kick of the coil 60 when the current is interrupted. The diode 66 is reversely connected so that it does not conduct current when the controlled rectifier 40 is conductive.

The relay 62 may comprise various contacts for performing the desired switching and signaling functions. As shown, the relay 62 comprises a contact 70 which is movable between contacts 71 and 72. When the coil 60 is de-energized the contact 70 engages the contact 71.

The control circuit associated with the relay 62 comprises power supply terminals 74 and 75 adapted to be supplied with alternating current. The movable contact 70 is connected to the power supply terminal 74. Various signaling and control devices may be connected between the contact 71 and the power supply terminal 75. As shown, these devices include an electric lamp 76, a warning horn 78, and a protective device 80, which may take the form of a valve, gate, conveyor, interlock relay, or the like.

Various other signal and control devices may be connected between the other contact 72 and the power supply terminal 75. As shown, such devices include an electric lamp 82, and a normally operative device 84, which may comprise a conveyor motor, a gate, an interlock relay, or the like.

It will be understood that the torque responsive switch 14 may comprise additional contacts for performing other switching functions. Thus, the illustrated switch 14 comprises a contact 86 which is movable between contacts 87 and 88, when the switch is operated. These contacts may be employed to control the operation of conveyor motors, signaling devices, interlock relays, and the like.

Figure 2:
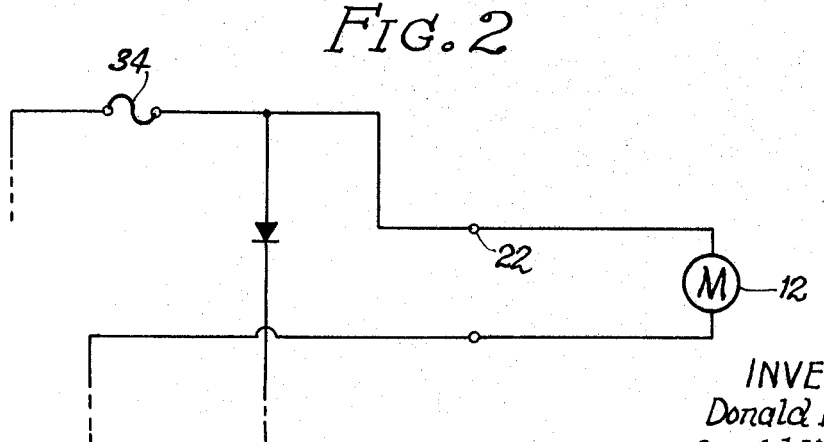
FIG. 2 is a fragmentary circuit diagram corresponding to a portion of FIG. 1 and showing a modified embodiment.

FIG. 2 illustrates a modified embodiment in which the torque responsive switch 14 is not employed to de-energize the motor 12. While the switch 14 may be employed to perform various external control and switching functions, it is not employed in the fail-safe system.

Thus, as shown in FIG. 2, the fuse 34 is connected directly to the motor terminal 22, without being connected through the switch. The resistor 54 is not employed. In other respects, the bin level indicator of FIG. 2 is the same as illustrated in FIG. 1.

It may be helpful to summarize the operation of the bin level indicator 10 of FIG. 1. In the absence of sufficient material in the bin to obstruct the rotation of the paddle wheel, the motor 12 operates normally. The switch 14 is in the position shown in FIG. 1, in which the contact 16 engages the contact 17 so as to energize the motor 12. The motor current flows through the resistor 48 and produces a sufficient voltage drop across the resistor to maintain the controlled rectifier 40 in a conductive state. A portion of the motor current flows to the control electrode 43 after being rectified by the diode 50.

The current through the main electrodes 41 and 42 of the rectifier 40 energizes the relay coil 60, so that the contact 70 is moved against the contact 72. As a result, the signal lamp 82 and normally operative device 84 are energized. The lamp 82 indicates that the bin level indicator is operating normally and that there has been no burn-out of the motor, and no failure of any other component.

When the motor 12 is stalled by the drag of the rising material upon the paddle wheel, the torque responsive switch 14 is actuated so that the contact 16 engages the contact 18, rather than the contact 17. Thus, the motor 12 is de-energized. However, a current corresponding approximately to the motor current flows into the input circuit 46 of the controlled rectifier 40 through the contacts 16 and 18 and resistor 54. Thus, the controlled rectifier 40 is maintained in a conductive state.

When the material in the bin drops away from the paddle wheel, the torque responsive switch returns to its initial position and the motor 12 is again energized. If the motor should burn-out, the motor current to the relay device is interrupted. As a result, the current from the input circuit 46 to the control electrode 43 is insufficient to maintain the rectifier 40 in a conductive state. Accordingly, the rectifier becomes non-conductive so that the relay coil 60 is de-energized. The relay contact 70 moves back against the contact 71, with the result that the signal lamp 76, the horn 78, and the protective device 80 are energized. The warning signals notify the operator that the bin level indicator is malfunctioning, and that the conveyor or other machine controlled by the bin level indicator is in need of attention. A protective device 80 may be energized to shut down the conveyor so that the flow of the material will be stopped.

It will be apparent that the bin level indicator is fail-safe against motor burn-out. At the same time, the fuse 34 protects the motor and other components against excessive current. If the motor develops a short circuit, the excessive current causes the fuse 34 to blow, so that the circuit is interrupted. The fuse 34 is also in the energizing circuit, to the controlled rectifier 40, so that the relay coil 60 is de-energized. Thus, blowing of the fuse 34 has the same effect as the burn-out of the motor. The fuse 34 also protects the system against other component failures which cause excessive current. Thus, failure of the controlled rectifier 40 may cause excessive current. The fuse 34 thereupon interrupts the circuit, with the result that the relay coil 60 is de-energized.

The torque responsive switch 14 is also subject to failure, and may eventually fail to function properly, so that an open circuit condition may develop between the contact 16 and either of the contacts 17 or 18. When such an open circuit develops, the controlled rectifier 40 is rendered non-conductive so that the relay coil 60 is de-energized.

In the modified arrangement of FIG. 2, the motor 12 remains energized at all times even when stalled. The motor current maintains the controlled rectifier 40 in a conductive state. If the motor 12 should burn-out, the interruption of the motor current renders the controlled rectifier 40 non-conductive so that the relay coil 60 is de-energized. Thus, the warning signals and the protective device are energized. It will be apparent that the modified construction of FIG. 2 is also fail-safe against motor burn-out. As before, the fuse 34 protects the system against excessive current and interrupts the circuit so as to produce the same result as motor burn-out. In both embodiments, the motor is preferably of the type in which the motor current in the stalled codition is substantially the same as the motor current in the normal operating condition.

The fail-safe system is compact and inexpensive and involves only the addition of a small control unit to the bin level indicator. The all solid state construction of the control unit provides a high degree of dependability and reliability.

We claim:
1. A fail-safe bin level indicator,
comprising the combination of a motor,
a torque responsive switch operable by the development of a predetermined torque by said motor,
said switch having first and second positions and having contacts for closing first and second circuits in said first and second positions,
means connecting said motor in said first circuit for energizing said motor when said switch is in said first position,
said motor being de-energized when said switch is in said second position,
a relay device connected in circuit with said motor and operable in response to interruption of the circuit through said motor,
and means connecting said second circuit of said switch to said relay device for preventing operation of said relay device by movement of said switch between said first and second positions,
whereby said relay device is operated by burn-out of said motor but not by the normal movement of said switch.

2. An indicator according to claim 1,
including an over-current circuit interruptor connected in circuit with said switch and said motor for interrupting the motor circuit and thereby operating said relay device in response to excessive current through said motor.

3. An indicator according to claim 1,
including a warning signal operable by said relay device to provide a warning in the event of motor burn-out.

4. An indicator according to claim 1,
including switch contacts operable by said relay device to perform switching functions in the event of motor burn-out.

5. An indicator according to claim 1,
in which said relay device comprises an electronic switching component having a first input connection to said motor and a second input connection to said second circuit of said switch, whereby the interruption of the motor circuit when said switch is in first position causes operation of said electronic switching component.

6. An indicator according to claim 1,
in which said relay device comprises an electronic switching component having main current carrying elements and a control element,
means connecting said motor to said control element,
and means connecting said second circuit to said control element,
whereby burn-out of the motor changes the electrical potential of said control element and thereby operates said electronic switching component.

7. An indicator according to claim 6,
in which said electronic switching component comprises a silicon controlled rectifier.

8. An indicator according to claim 1,
in which said relay device comprises a solid state controlled rectifier having anode and cathode electrodes and
a control electrode,
an electro-magnetic relay coil connected in circuit with said anode and cathode electrodes,
switching contacts operable by said coil for performing switching functions in the event of motor burn-out,
an input circuit connected between said motor and said control electrode,
whereby the motor current is supplied to said input circuit to maintain said rectifier in a conductive state,
and means connected between said input circuit and said second circuit of said switch,
whereby current is supplied from said second circuit to said input circuit to maintain said rectifier in a conductive state,
whereby said rectifier will be rendered non-conductive by motor burn-out but not by normal movement of said switch.

9. An indicator according to claim 8,
in which an impedance element is connected between said input circuit and said second circuit of said switch to provide a current comparable to the motor current.

10. An indicator according to claim 8,
in which a resistor is connected between said input circuit and said second circuit of said switch to provide a current comparable to the motor current.

11. A fail-safe control device for a bin level indicator of the type having a motor and a torque responsive switch for de-energizing said motor in response to the development of a pre-determined torque by said motor,
said control device comprising the combination of a first input circuit adapted to be connected to said motor for receiving the motor current,
a second input circuit adapted to be connected to said switch,
said switch having contacts for energizing said second input circuit when said motor is de-energized,
and a relay device connected to said first input circuit, and operable in response to the interruption of the motor current,
said relay device having means operable by energization of said second input circuit for preventing operation of said relay device,
whereby said relay device is operated by motor burn-out but not by normal movement of the said switch.

12. A fail-safe bin level indicator,
comprising the combination of a motor, a torque-responsive switch operable by the development of a predetermined torque by said motor,
a relay device,
means responsive to electrical current through said motor for actuating said relay device,
an alarm circuit,
and means operable by actuation of said relay device for deactivating said alarm circuit,
said relay device being effective to actuate said alarm circuit in response to deactuation of said relay device,
whereby burn-out of said motor actuates said alarm circuit.

13. An indicator according to claim 12,
in which said relay device includes an electronic switching component having a control element connected to said motor.

14. An indicator according to claim 12,
in which said alarm circuit comprises a normally operating device,
and means for deenergizing said normally operating device in response to deactuation of said relay device.

15. An indicator according to claim 12,
including an over-current interruptor in series with said motor and operable by excessive motor current.

References Cited

UNITED STATES PATENTS

| | | | |
|---|---|---|---|
| 2,116,075 | 5/1938 | Lenhart | 200—61.21 |
| 2,197,868 | 4/1940 | Knowlton | 317—31 X |
| 2,280,945 | 4/1942 | Gamel et al. | 317—31 X |
| 2,855,545 | 10/1958 | Beyrard | 317—31 X |
| 2,909,766 | 10/1959 | Bozich | 200—61.21 X |
| 3,001,099 | 9/1961 | Larkey | 317—31 X |
| 3,078,392 | 2/1963 | Bollesen | 317—31 X |
| 3,210,495 | 10/1965 | Lau | 200—61.21 |
| 3,259,803 | 7/1966 | Battista | 317—31 |

LEE T. HIX, Primary Examiner

J. D. TRAMMELL, Assistant Examiner

U.S. Cl. X.R.

200—61.21; 317—31, 33, 40; 340—246